United States Patent
Sawamura

(10) Patent No.: US 10,872,137 B2
(45) Date of Patent: *Dec. 22, 2020

(54) IC CARD AND METHOD FOR CONTROLLING IC CARD

(71) Applicants: Kabushiki Kaisha Toshiba, Minato-ku (JP); Toshiba Infrastructure Systems & Solutions Corporation, Kawasaki (JP)

(72) Inventor: Satoshi Sawamura, Yokohama (JP)

(73) Assignees: Kabushiki Kaisha Toshiba, Minato-ku (JP); Toshiba Infrastructure Systems & Solutions Corporation, Kawasaki (JP)

(*) Notice: Subject to any disclaimer, the term of this patent is extended or adjusted under 35 U.S.C. 154(b) by 227 days.

This patent is subject to a terminal disclaimer.

(21) Appl. No.: 15/909,061

(22) Filed: Mar. 1, 2018

(65) Prior Publication Data

US 2018/0276358 A1    Sep. 27, 2018

(30) Foreign Application Priority Data

Mar. 22, 2017   (JP) .................................. 2017-055786

(51) Int. Cl.
  *H04L 29/00*   (2006.01)
  *G06F 21/32*   (2013.01)
  (Continued)

(52) U.S. Cl.
  CPC ......... *G06F 21/32* (2013.01); *G06K 9/00013* (2013.01); *G06K 19/07* (2013.01);
  (Continued)

(58) Field of Classification Search
  CPC ........ G06F 21/32; G06F 3/0604; G06F 21/35; G06F 21/44; G06F 21/629
  See application file for complete search history.

(56) References Cited

U.S. PATENT DOCUMENTS

2003/0217270 A1   11/2003   Nakayama
2004/0086157 A1    5/2004   Sukegawa
(Continued)

FOREIGN PATENT DOCUMENTS

CN   106503777 A   3/2017
EP   1 074 949 A1   2/2001
(Continued)

OTHER PUBLICATIONS

Extended European Search Report dated Jul. 26, 2018 in Patent Application No. 18159706.3.
(Continued)

*Primary Examiner* — Ghazal B Shehni
(74) *Attorney, Agent, or Firm* — Oblon, McClelland, Maier & Neustadt, L.L.P.

(57) ABSTRACT

An integrated circuit (IC) card of an embodiment includes a communicator, a storage storing a plurality of pieces of biometric authentication information, an acquirer, and a processor. The communicator communicates with a terminal device. The acquirer acquires biometric information of a user. The processor collates the biometric information acquired by the acquirer with each of the plurality of pieces of biometric authentication information stored in the storage in a case that the communicator receives a command from the terminal device and updates some of the plurality of pieces of biometric authentication information stored in the storage with information on the basis of the biometric information acquired by the acquirer in accordance with collation results for the biometric authentication information.

8 Claims, 8 Drawing Sheets

(51) Int. Cl.
  *G06K 19/07* (2006.01)
  *G06K 9/00* (2006.01)
  *G07C 9/25* (2020.01)
  *H04L 9/08* (2006.01)
  *H04L 9/30* (2006.01)
  *H04L 9/32* (2006.01)
  *G07C 9/26* (2020.01)

(52) U.S. Cl.
  CPC ............ *G07C 9/257* (2020.01); *H04L 9/0869* (2013.01); *H04L 9/30* (2013.01); *H04L 9/3231* (2013.01); *G07C 9/26* (2020.01)

(56) References Cited

U.S. PATENT DOCUMENTS

| | | | |
|---|---|---|---|
| 2004/0129787 A1 | 7/2004 | Saito et al. | |
| 2006/0080548 A1* | 4/2006 | Okamura | G06F 21/32 713/186 |
| 2006/0089809 A1 | 4/2006 | Satou et al. | |
| 2007/0220273 A1 | 9/2007 | Campisi | |
| 2008/0122577 A1 | 5/2008 | Gutta et al. | |
| 2008/0252412 A1* | 10/2008 | Larsson | B60R 25/25 340/5.2 |
| 2008/0289032 A1 | 11/2008 | Aoki | |
| 2009/0084858 A1 | 4/2009 | Borracci | |
| 2009/0201128 A1 | 8/2009 | Campisi | |
| 2013/0036463 A1 | 2/2013 | Shashidhar | |
| 2015/0286922 A1 | 10/2015 | Saito | |
| 2016/0171199 A1 | 6/2016 | Beatson et al. | |
| 2018/0108018 A1 | 4/2018 | Lee | |

FOREIGN PATENT DOCUMENTS

| | | |
|---|---|---|
| EP | 1 416 427 A2 | 5/2004 |
| JP | 2000-094873 | 4/2000 |
| JP | 2006-119811 | 5/2006 |
| JP | 2006-163492 A | 6/2006 |
| JP | 2006-527424 | 11/2006 |
| JP | 2007-26118 | 2/2007 |
| JP | 2007-233461 | 9/2007 |
| JP | 2007-334707 | 12/2007 |
| JP | 2010-128600 | 6/2010 |

OTHER PUBLICATIONS

Search Report and Written Opinion dated Sep. 14, 2018 in corresponding Singaporean Patent Application No. 10201801705U citing documents AA, AB, AC and AD therein, 7 pages.
Office Action dated Jun. 29, 2020 in co-pending U.S. Appl. No. 15/904,622, citing documents AA-AC, 12 pages.
Office Action dated Mar. 5, 2020 in co-pending U.S. Appl. No. 15/904,622, citing documents AA-AH, AO-AR, and AW-AZ therein, 18 pages.
Search Report dated Jul. 5, 2018 in Singaporean Patent Application No. 10201801644Q.
Extended Search Report dated Jul. 25, 2018 in European Patent Application No. 18158361.8.

* cited by examiner

FIG. 6

| CONDITION | SCORE | DETERMINATION |
|---|---|---|
| FIRST PREDETERMINED CONDITION | 90 OR MORE | AUTHENTICATION SUCCESS |
| SECOND PREDETERMINED CONDITION | 70 TO 90 | UPDATE TARGET |
| THIRD PREDETERMINED CONDITION | LESS THAN 70 | AUTHENTICATION FAILURE |

FIG. 8

| | | |
|---|---|---|
| 90 OR MORE | | PROCESS COMPLETION AS AUTHENTICATION SUCCESS |
| 70 TO 90 | LESS THAN 90 | PROCESS COMPLETION AS AUTHENTICATION SUCCESS |
| | | PROCESS COMPLETION AS AUTHENTICATION SUCCESS |
| | | MOVE TO SECOND COLLATION (ACQUIRED BIOMETRIC INFORMATION IS HELD) |
| | | MOVE TO SECOND COLLATION (ACQUIRED BIOMETRIC INFORMATION IS HELD) |
| | | MOVE TO SECOND COLLATION (ACQUIRED BIOMETRIC INFORMATION IS HELD) |
| LESS THAN 70 | | MOVE TO SECOND COLLATION (ACQUIRED BIOMETRIC INFORMATION IS DISCARDED) |
| | | MOVE TO SECOND COLLATION (ACQUIRED BIOMETRIC INFORMATION IS DISCARDED) |
| | | MOVE TO SECOND COLLATION (ACQUIRED BIOMETRIC INFORMATION IS DISCARDED) |

FIG. 9

| SCORE OF BIOMETRIC AUTHENTICATION INFORMATION A | SCORE OF BIOMETRIC AUTHENTICATION INFORMATION B | PROCESSING CONTENT |
|---|---|---|
| LESS THAN 90 | 90 OR MORE | IF THERE IS BIOMETRIC INFORMATION ACQUIRED AT FIRST TIME, THIS INFORMATION IS TRANSMITTED TO IC CHIP |
| | | IF THERE IS BIOMETRIC INFORMATION ACQUIRED AT FIRST TIME, THIS INFORMATION IS TRANSMITTED TO IC CHIP |
| | | IF THERE IS BIOMETRIC INFORMATION ACQUIRED AT FIRST TIME, THIS INFORMATION IS TRANSMITTED TO IC CHIP |
| | 70 TO 90 | PROCESS TERMINATION AS AUTHENTICATION FAILURE |
| | | PROCESS TERMINATION AS AUTHENTICATION FAILURE |
| | LESS THAN 70 | PROCESS TERMINATION AS AUTHENTICATION FAILURE |
| | | PROCESS TERMINATION AS AUTHENTICATION FAILURE |
| | | PROCESS TERMINATION AS AUTHENTICATION FAILURE | though the IC card of the
IC CARD AND METHOD FOR CONTROLLING IC CARD

CROSS REFERENCE TO RELATED APPLICATION

This application is based upon and claims the benefit of priority from Japanese Patent Application No. 2017-055786, filed Mar. 22, 2017, the entire contents of which are incorporated herein by reference.

BACKGROUND

Field

Embodiments of the present invention relate to an integrated circuit (IC) card and a method for controlling the IC card.

Description of Related Art

In recent years, IC cards having a function of performing personal authentication using biometric information of a user using an IC card have begun to become widespread. For example, the biometric information is information of a fingerprint of a finger, a vein, an iris of an eye, and the like. The biometric information is pre-stored in an IC chip embedded in the IC card. However, because the body of a user changes day by day with aging or the like, there are some cases in which the accuracy of personal authentication decreases even in the case of the same person.

BRIEF DESCRIPTION OF THE DRAWINGS

FIG. 6 is a diagram showing an example of a score serving as a threshold value of each condition.

FIG. 8 is a diagram showing an example of processing content corresponding to collation results when two types of biometric authentication information are used.

FIG. 9 is a diagram showing an example of processing content corresponding to collation results when two types of biometric authentication information are used.

DETAILED DESCRIPTION

An integrated circuit (IC) card of an embodiment includes a communicator, a storage storing a plurality of pieces of biometric authentication information, an acquirer, and a processor. The communicator communicates with a terminal device. The acquirer acquires biometric information of a user. The processor collates the biometric information acquired by the acquirer with each of the plurality of pieces of biometric authentication information stored in the storage in a case that the communicator receives a command the terminal device and updates some of the plurality of pieces of biometric authentication information stored in the storage with information on the basis of the biometric information acquired by the acquirer in accordance with collation results for the biometric authentication information.

Hereinafter, an IC card and a method for controlling the IC card according to embodiments will be described with reference to the drawings. Although the IC card of the embodiment is assumed to be a contact type IC card in the following description, a non-contact type IC card may be used.

Figure 1:
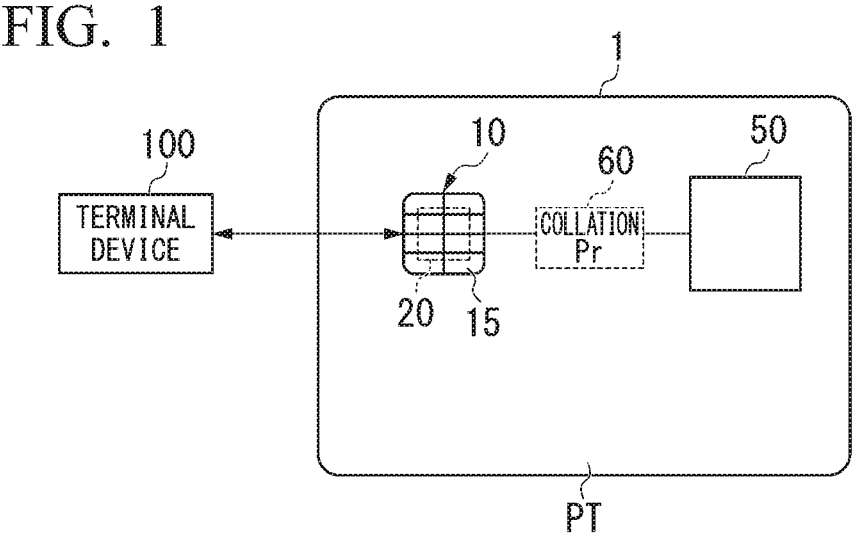
FIG. 1 is a schematic configuration diagram of an IC card according to an embodiment.

FIG. 1 is a schematic configuration diagram of an IC card 1 according to the embodiment. For example, the IC card 1 is formed by mounting an IC module 10 on a plastic card base material PT (an example of a card body). That is, the IC card 1 includes the IC module 10, a fingerprint sensor 50, a collation processor (collation Pr in FIG. 1) 60, and the card base material PT in which these are embedded. The IC card 1 can communicate with an external terminal device 100 via a contact portion 15. The collation processor 60 authenticates a user by comparing fingerprint information of the user acquired by the fingerprint sensor 50 with biometric authentication information held within the IC module 10 and outputs an authentication result to the IC module 10. The fingerprint sensor 50 is an example of an "acquirer" for acquiring biometric information and the fingerprint information is an example of the "biometric information." The biometric information may be vein pattern information, iris information, voice print information, DNA information, or the like as well as fingerprint information. A case in which the collation processor 60 is provided outside the IC module 10 is only an example and the IC module 10 may have a function corresponding to that of the collation processor 60.

For example, the IC card 1 receives a command (a processing request) transmitted by the terminal device 100 via the contact portion 15 and executes processing (command processing) according to the received command. Then, the IC card 1 transmits a response (a processing response) which is a result of executing the command processing to the terminal device 100 via the contact portion 15. The terminal device 100 is a device configured to communicate with the IC card 1, and is, for example, a device including a reader/writer device.

The IC module 10 includes the contact portion 15 and an IC chip 20. For example, the IC module 10 is a module by which a transaction is performed in the form of a chip on tape (COT) in which a plurality of IC modules 10 are arranged on a tape or the like. A single IC module 10 cut out and isolated from the tape may be referred to as a COT.

The contact portion 15 has terminals for various types of signals necessary for the IC card 1 to operate. The terminals for the various types of signals include terminals for supplying a power supply voltage, a clock signal, a reset signal, and the like from the terminal device 100 and a serial data input/output terminal (an SIO terminal) for communicating with the terminal device 100.

The IC chip 20 includes, for example, a large scale integration (LSI) such as a one-chip microprocessor.

Figure 2:
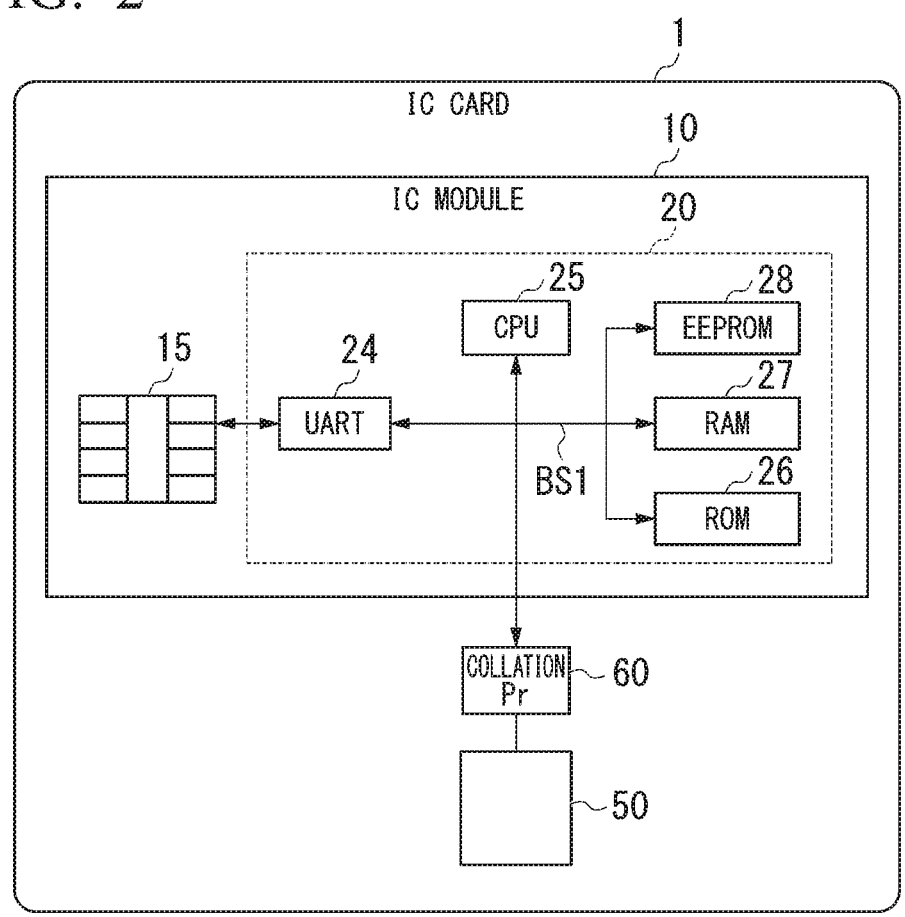
FIG. 2 is a hardware configuration diagram of the IC card according to the embodiment.

FIG. 2 is a hardware configuration diagram of the IC card 1 according to the embodiment. As illustrated in FIG. 2, the IC card 1 includes the IC module 10 including the contact portion 15 and the IC chip 20. The IC chip 20 includes a universal asynchronous receiver transmitter (UART) 24, a CPU 25, a read only memory (ROM) 26, a random access memory (RAM) 27, and an electrically erasable programmable ROM (EEPROM) 28. These components are connected via an internal bus BS1.

The UART 24 performs serial data communication with the terminal device 100 via the above-described SIO terminal. The UART 24 outputs data (for example, 1-byte data) obtained by performing parallel conversion on the serial data signal received via the SIO terminal to the internal bus BS1. The UART 24 performs serial conversion on data acquired via the internal bus BS1 and outputs serial data to the terminal device 100 via the SIO terminal. For example, the UART 24 receives a command from the terminal device 100 via the SIO terminal. The UART 24 transmits a response to the terminal device 100 via the SIO terminal. The UART 24 is an example of a "communicator."

The CPU 25 executes a program stored in the ROM 26 or the EEPROM 28 to perform various types of processes of the IC card 1. For example, the CPU 25 executes command processing according to the command received by the UART 24 via the contact portion 15.

The ROM 26 includes, for example, a nonvolatile memory such as a mask ROM. The ROM 26 stores programs for executing various types of processes of the IC card 1 and data such as a command table.

The RAM 27 includes, for example, a volatile memory such as a static RAM (SRAM). The RAM 27 temporarily stores data to be used when various types of processes of the IC card 1 are performed.

The EEPROM 28 includes, for example, an electrically rewritable nonvolatile memory. The EEPROM 28 stores various types of data used by the IC card 1. For example, the EEPROM 28 stores information used for various types of services (applications) using the IC card 1.

The collation processor 60 is connected to the internal bus BS1. For example, the collation processor 60 includes a CPU and a program memory. The collation processor 60 is connected to the fingerprint sensor 50 by a dedicated line or the like, and can detect whether or not the fingerprint sensor 50 is in a state in which fingerprint information can be acquired (a power-on state). For example, when the user's finger touches the fingerprint sensor 50 and the fingerprint sensor 50 is powered on, the collation processor 60 determines that the fingerprint sensor 50 is in a state in which fingerprint information can be acquired. The fingerprint sensor 50 acquires the fingerprint information of the user in any one of an electrostatic capacitance type, a thermosensitive type, an optical type, and the like.

Figure 3:
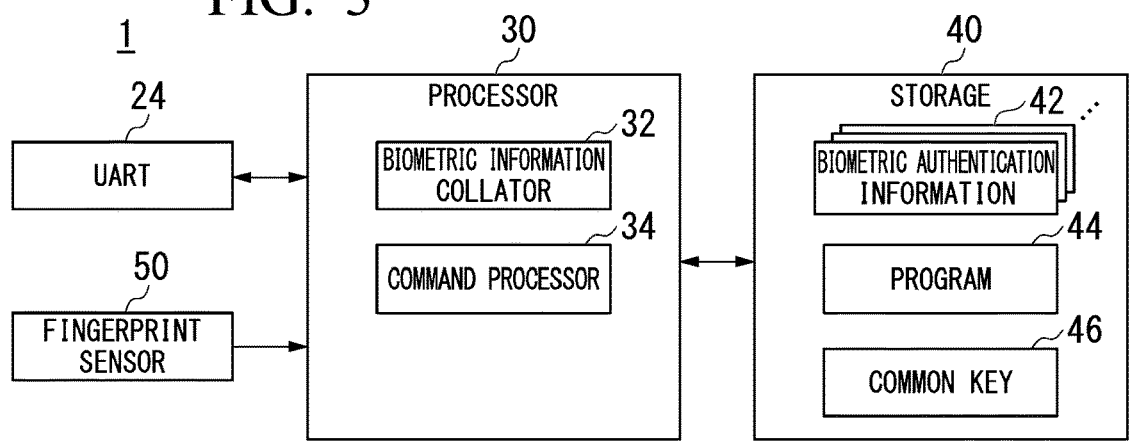
FIG. 3 is a functional configuration diagram of the IC card according to the embodiment.

FIG. 3 is a functional configuration diagram of the IC card 1 according to the embodiment. For example, the IC card 1 includes the above-described UART 24 and fingerprint sensor 50, a processor 30, and a storage 40. For example, the processor 30 includes a biometric information collator 32 and a command processor 34. For example, the command processor 34 is implemented by the CPU 25 executing a program 44.

For example, the biometric information collator 32 is implemented by the collation processor 60 executing the program 44. For example, the storage 40 is implemented by a program memory attached to the EEPROM 28 or the collation processor. In the storage 40, a plurality of pieces of biometric authentication information 42, the program 44, and a common key 46 are pre-stored.

For example, each of the plurality of pieces of biometric authentication information 42 includes various pieces of information extracted from different parts of a body of the user who is an owner of the IC card 1, such as a thumb, an index finger, a middle finger, a ring finger, and a little finger. The biometric authentication information 42 is information to be collated with the fingerprint information acquired by the fingerprint sensor 50 and includes information in which a shape pattern of a fingerprint is designated as geometric information, information converted into some feature amount, a combination thereof, or the like.

The biometric information collator 32 compares the fingerprint information acquired by the fingerprint sensor 50 with each of the plurality of pieces of biometric authentication information 42 pre-stored in the storage 40 and determines that personal authentication succeeds in a case that the acquired fingerprint information matches any biometric authentication information 42. For example, "matching" means that a score indicating a degree of matching of information is greater than or equal to a threshold value. When the personal authentication succeeds, the biometric information collator 32 permits access to a secure region in the storage 40 and is brought into a state in which a predetermined process can be executed.

The command processor 34 executes processing (command processing) of various types of commands in accordance with a command (a processing request) transmitted by the terminal device 100. The command processor 34 transmits a response, which is a command processing result, to the terminal device 100 via the UART 24. With respect to the command processing under a condition of the success of collation (the success of personal authentication), in a case that the authentication success notification is issued from the biometric information collator 32, that is, in a case that access to the secure region in the storage 40 is permitted, the command processor 34 proceeds to perform the process.

[Flow of Process of IC Card]

Figure 4:
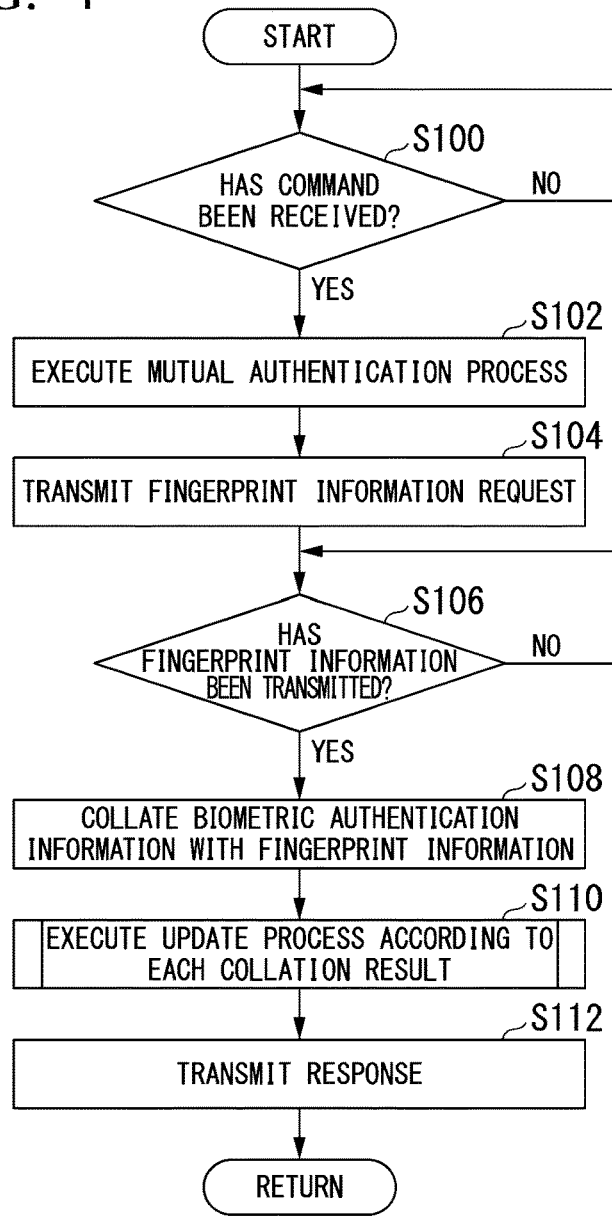
FIG. 4 is a flowchart schematically showing a flow of a process to be executed by a processor (an IC chip and a collation processor).

FIG. 4 is a flowchart showing an outline of a flow of a process to be executed by the processor 30 (the IC chip 20 and the collation processor 60). For example, the process of the present flowchart is iterated in a predetermined cycle.

First, the processor 30 waits for a command to be received from the terminal device 100 by the UART 24 (step S100). When the command is received from the terminal device 100, the processor 30 performs a mutual authentication process between the IC chip 20 and the collation processor 60. Mutual authentication means that both the IC chip 20 and the collation processor 60 mutually authenticate a legitimacy of a partner. For example, when a receiving side can decrypt information encrypted by a transmitting side, the legitimacy of both the sides is authenticated.

For example, as the mutual authentication process, the command processor 34 implemented by the IC chip 20 generates a temporary session key on the basis of the common key 46 pre-stored in the storage 40 and a random number generated by a predetermined rule and encrypts information to be transmitted using this session key. For example, the command processor 34 uses information obtained by performing an exclusive OR operation on the common key 46 and the random number as the session key. Then, the command processor 34 transmits the encrypted information and the generated random number to the collation processor 60. The session key is an example of a "public key."

The biometric information collator 32 implemented by the collation processor 60 generates a session key on the basis of the common key 46 stored in the storage 40 and the random number transmitted by the command processor 34 and uses this session key to decrypt the information encrypted by the command processor 34. For example, the biometric information collator 32 sets information obtained by performing an exclusive OR operation on the encrypted information and the session key as information before encryption.

Hereinafter, the processor 30 performs the process shown in the flowchart while performing such a mutual authentication process. That is, it is assumed that information transmitted and received between the IC chip 20 and the collation processor 60 for implementing the processor 30 is encrypted.

After the command is received, the processor 30 transmits request information for requesting transmission of fingerprint information to the fingerprint sensor 50 (step S104). In response thereto, the fingerprint sensor 50 transmits the fingerprint information in a predetermined data format and transmission period.

Next, the processor 30 waits for the fingerprint information to be transmitted by the fingerprint sensor 50 (step S106). In a case that the fingerprint information is transmitted by the fingerprint sensor 50, the processor 30 stores the fingerprint information into the storage 40 and collates the fingerprint information acquired by the fingerprint sensor 50 with each of a plurality of pieces of biometric authentication information 42 pre-stored in the storage 40 (step S108).

Next, the processor 30 performs a process of updating the biometric authentication information 42 in accordance with a result of collating the fingerprint information with each piece of biometric authentication information 42 (step S110). Details of the process of updating the biometric authentication information 42 will be described below.

Next, the processor 30 performs command processing in accordance with a collation result (a personal authentication result), and transmits a response, which is a command processing result, to the terminal device 100 via the UART 24 (step S112). Thereby, the process of this flowchart ends.

Figure 5:
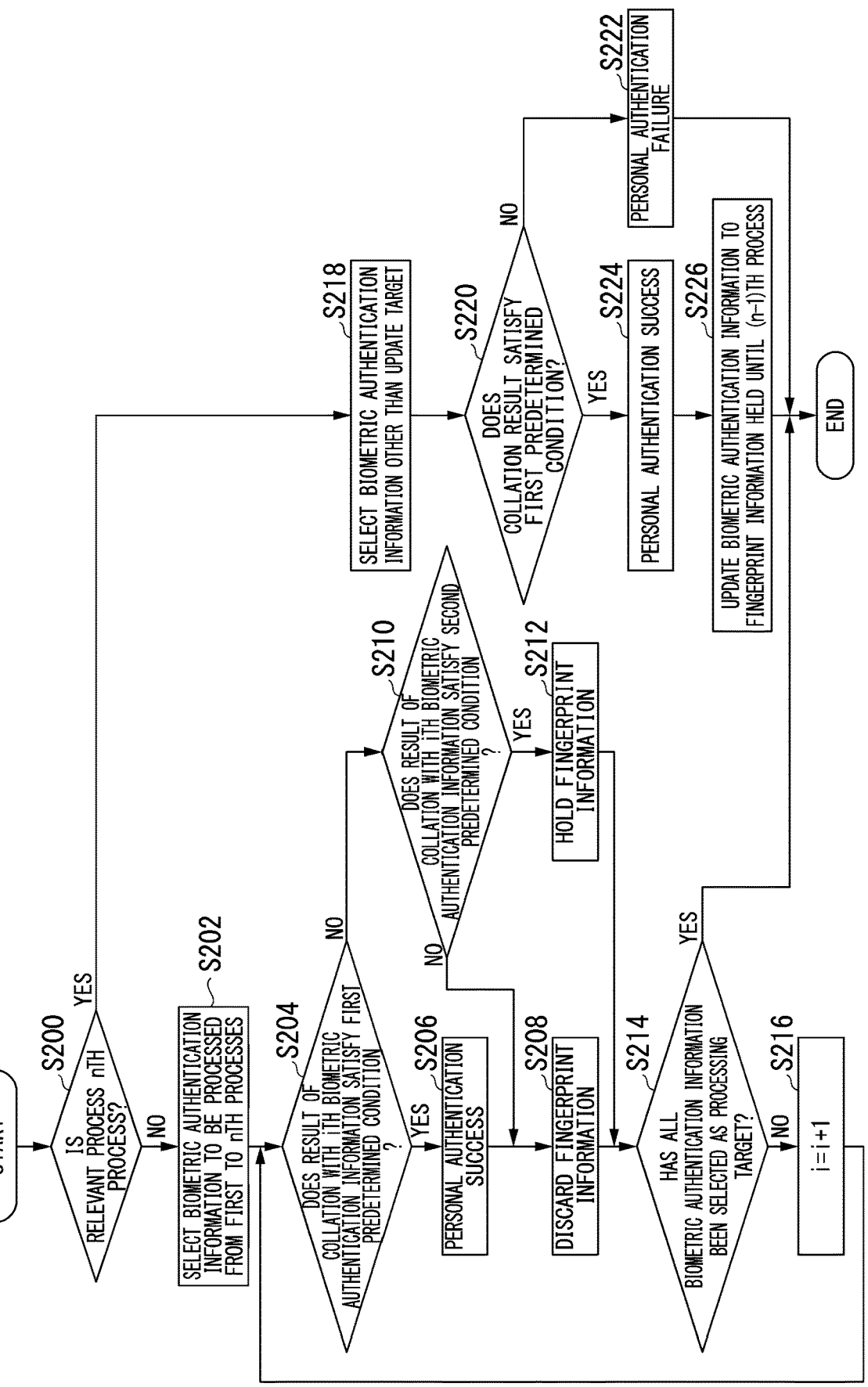
FIG. 5 is a flowchart showing an example of a process of updating biometric authentication information.

FIG. 5 is a flowchart showing an example of the process of updating the biometric authentication information 42 (the above-described processing of S110).

First, the processor 30 determines whether or not an iterated process of the above-described flowchart is an $n^{th}$ process (n is the number of pieces of biometric authentication information 42) (step S200) and selects one piece of the biometric authentication information as a processing target from among n pieces of the biometric authentication information 42 in a case that it is determined that the process is not the $n^{th}$ process and the number of iterations is less than n (step S202). Hereinafter, one piece of the biometric authentication information selected as the processing target will be described as being referred to as "$i^{th}$ biometric authentication information."

Next, the processor 30 determines whether or not a result of collating the $i^{th}$ biometric authentication information selected as the processing target with the fingerprint information acquired in response to the request (the fingerprint information received in the processing of S106) satisfies a first predetermined condition (step S204). The first predetermined condition is, for example, that a score indicating a degree of matching of information as a collation result is greater than or equal to a certain first threshold value Th1 (score value≥first threshold value Th1). The first predetermined condition is an example of a "predetermined condition."

In a case that it is determined that the $i^{th}$ biometric authentication information and the fingerprint information match with a score greater than or equal to the first threshold value Th1, that is, in a case that it is determined that the first predetermined condition is satisfied, the processor 30 determines that the personal authentication has succeeded (the user of the IC card 1 is a person identical to a card owner) (step S206).

Next, the processor 30 discards the fingerprint information acquired in response to the request from the storage 40 (step S208).

On the other hand, in a case that it is determined that the $i^{th}$ biometric authentication information and the fingerprint information do not match with a score greater than or equal to the first threshold value Th1, that is, in a case that it is determined that the first predetermined condition is not satisfied, the processor 30 determines whether or not the result of collating the $i^{th}$ biometric authentication information with the fingerprint information satisfies a second predetermined condition (step S210). The second predetermined condition is, for example, that a score indicating a degree of matching of information as a collation result is less than the first threshold value Th1 and greater than or equal to a second threshold value Th2 that is smaller than the first threshold value Th1 (first threshold value Th1>score value≥second threshold value Th2).

In a case that it is determined that the $i^{th}$ biometric authentication information and the fingerprint information match with a score less than the first threshold value Th1 and greater than or equal to the second threshold value Th2, that is, in a case that it is determined that the second predetermined condition is satisfied, the processor 30 causes the storage 40 to hold the fingerprint information acquired in response to the request as it is without confirming whether or not personal authentication has succeeded (step S212).

On the other hand, in a case that it is determined that the $i^{th}$ biometric authentication information and the fingerprint information do not match with a score less than the first threshold value Th1 and greater than or equal to the second threshold value Th2, that is, in a case that it is determined that the second predetermined condition is not satisfied, the processor 30 proceeds to the processing of S208 without confirming whether or not the personal authentication has succeeded and discards the fingerprint information acquired in response to the request from the storage 40.

Next, the processor 30 determines whether or not all of the n pieces of the biometric authentication information 42 have been selected as the processing target (step S214), selects one piece of the biometric authentication information 42 as "$i+1^{th}$ biometric authentication information" from among one or more other pieces of the biometric authentication information 42 excluding the biometric authentication information 42 already selected as the processing target in a case that it is determined that not all the biometric authentication information 42 as the processing target has been selected (step S216), and moves to the processing of S204 described above.

On the other hand, in a case that it is determined that an iterated process of the above-described flowchart is an $n^{th}$ process, the processor 30 selects biometric authentication information different from biometric authentication information (hereinafter referred to as update target biometric authentication information) whose collation result does not satisfy the first predetermined condition from among the n pieces of the biometric authentication information 42 in the course of processing up to a previous $(n-1)^{th}$ process (step S218).

Next, the processor 30 determines whether or not each result of collating the biometric authentication information different from the update target biometric authentication information with the fingerprint information acquired in response to the request (fingerprint information acquired in the processing of S106 in the (n−1)$^{th}$ process) satisfies the first predetermined condition (step S220).

In a case that it is determined that the collation results do not satisfy the first predetermined condition, the processor 30 determines that the personal authentication has failed (the user of the IC card 1 is not a person identical to the card owner) (step S222).

On the other hand, in a case that it is determined that a collation result satisfies the first predetermined condition, the processor 30 determines that the personal authentication has succeeded (the user of the IC card 1 is a person identical to the card owner) (step S224).

Then, the processor 30 updates each piece of the update target biometric authentication information by rewriting the update target biometric authentication information with the fingerprint information held in the storage 40 until the (n−1)$^{th}$ process (step S226). Thereby, the process of this flowchart ends.

FIG. 6 is a diagram showing an example of a score serving as a threshold value for each condition. For example, the first predetermined condition is that the score is 90 or more in a case that a maximum value is 100 and it is determined that the personal authentication has succeeded in a case that the first predetermined condition is satisfied. The second predetermined condition is that the score is 70 or more and less than 90 and biometric authentication information which is target for obtaining the score is determined to be biometric authentication information to be updated in a case that the second predetermined condition is satisfied. A third predetermined condition is that the score is less than 70 and it is determined that the personal authentication has failed in a case that the third predetermined condition is satisfied.

[Sequential Process Between Terminal Device and IC Card]

Figure 7:
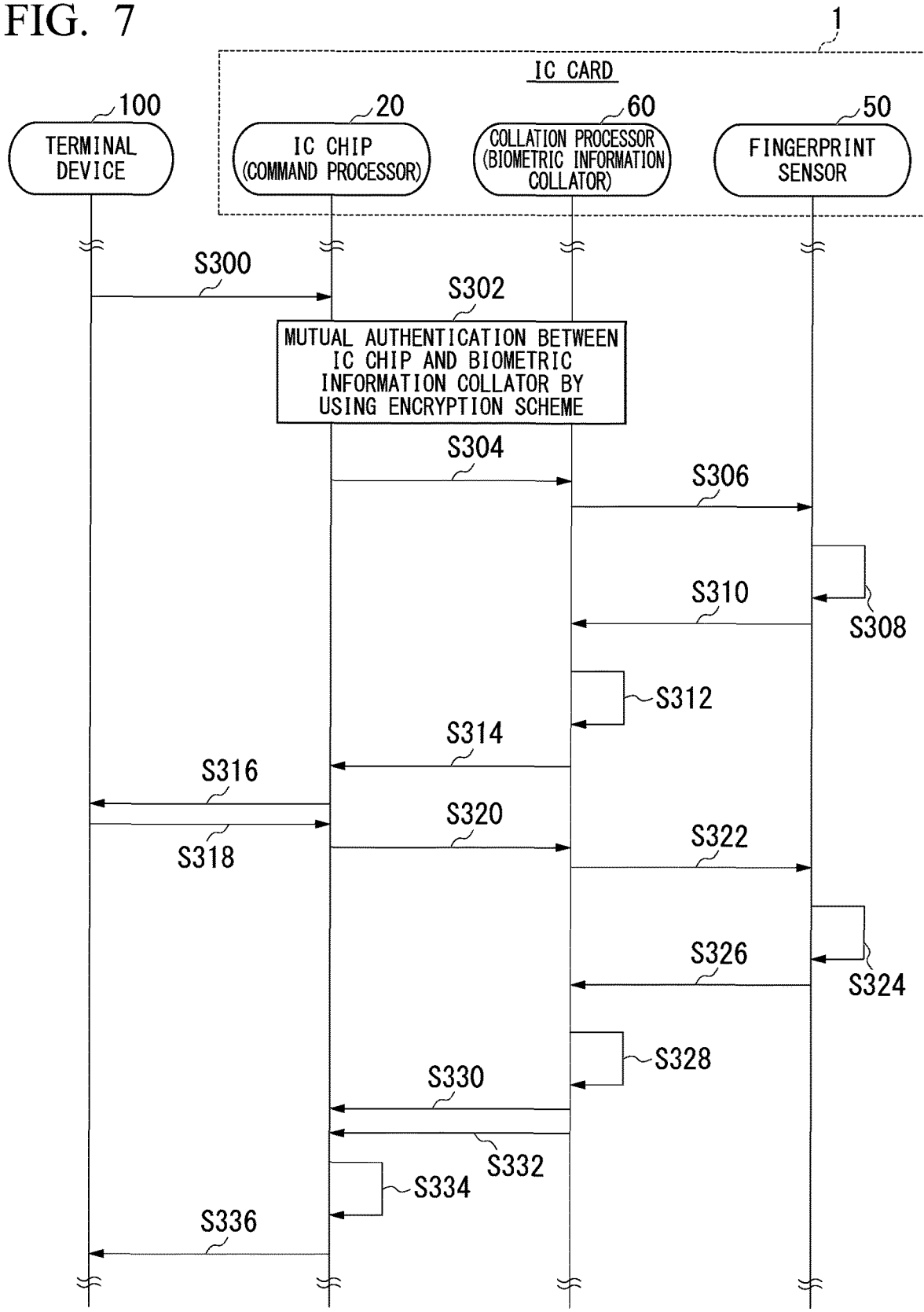
FIG. 7 is a sequence diagram showing an example of a process to be executed by a terminal device and the IC card.

FIG. 7 is a sequence diagram showing an example of a process to be executed by the terminal device 100 and the IC card 1. In the process of the present sequence, two types of biometric authentication information are stored in the storage 40, and a collation process (a personal authentication process) is performed using the two types of biometric authentication information. Hereinafter, one of the two types of biometric authentication information will be described by being referred to as biometric authentication information A and the other will be described by being referred to as biometric authentication information B. In the present sequence processing, the IC chip 20 configured to implement the command processor 34 and the collation processor 60 configured to implement the biometric information collator 32 will be described as subjects of operations. Thus, the IC chip 20 may be replaced with the command processor 34 and the collation processor 60 may be replaced with the biometric information collator 32.

First, the terminal device 100 transmits a command for requesting personal authentication to the IC chip 20 of the IC card 1 (step S300).

Next, in order to perform mutual authentication with the collation processor 60, the IC chip 20 (the command processor 34) generates a temporary session key on the basis of the common key 46 pre-stored in the storage 40 and a random number generated by a predetermined rule (step S302).

Next, the IC chip 20 reads the two type of biometric authentication information A and B stored in the storage 40, encrypts the biometric authentication information A and B with the session key, and transmits the encrypted biometric authentication information A and B and the generated random number to the collation processor 60 (step S304).

In response thereto, the collation processor 60 (the biometric information collator 32) transmits request information for requesting transmission of the fingerprint information to the fingerprint sensor 50 (step S306).

In response thereto, the fingerprint sensor 50 acquires fingerprint information X (step S308) and transmits the fingerprint information X to the collation processor 60 in a predetermined data format and transmission period (step S310).

Next, the collation processor 60 stores the fingerprint information X received from the fingerprint sensor 50 into the storage 40, generates a session key on the basis of the random number received from the IC chip 20 and the common key 46 stored in the storage 40, and decrypts the encrypted biometric authentication information A and B by using this session key. Then, the collation processor 60 collates each piece of the decrypted biometric authentication information A and B with the fingerprint information X acquired by the fingerprint sensor 50 (step S312).

FIG. 8 is a diagram showing an example of processing content corresponding to collation results when two types of biometric authentication information are used. For example, when the score of the biometric authentication information A for the fingerprint information X received in the processing of S310 is 90 or more (when the first predetermined condition is satisfied), the collation processor 60 determines that the personal authentication has succeeded in a case that the score of the other biometric authentication information B is less than 90.

When the score of the biometric authentication information A for the fingerprint information X is 70 or more and less than 90 (when the second predetermined condition is satisfied), the collation processor 60 determines that the success or failure of the personal authentication is not confirmed in a case that the score of the other biometric authentication information B is less than 90. At this time, the collation processor 60 causes the storage 40 to hold the stored fingerprint information X as it is. In a case that a determination result indicating that the success or failure of the personal authentication is not confirmed is obtained, the terminal device 100 retransmits a command for requesting the personal authentication to the IC card 1. Thereby, the IC card 1 side moves to a second collation process.

When the score of the biometric authentication information A for the fingerprint information X is less than 70 (when the first and second predetermined conditions are not satisfied), the collation processor 60 determines that the success or failure of the personal authentication is not confirmed in a case that the score of the other biometric authentication information B is less than 90. At this time, the collation processor 60 causes the storage 40 to discard the stored fingerprint information X without holding it. Because the determination result indicating that the success or failure of the personal authentication is not confirmed is obtained as described above, the terminal device 100 retransmits a command for requesting personal authentication to the IC card 1. Thereby, the IC card 1 side moves to the second collation process.

As described above, the collation processor 60 performs a determination in accordance with scores of the biometric authentication information A and B, encrypts the collation results of the biometric authentication information by using the generated session key, and transmits the encrypted collation results to the IC chip 20 (step S314).

Next, the IC chip 20 uses the session key used when biometric authentication information A and B are encrypted to decode the collation results transmitted by the collation processor 60 and executes command processing corresponding to a command received in the processing of S300 on the basis of the decoded collation results. Then, the IC chip 20 transmits a response, which is a command processing result, to the terminal device 100 via the UART 24 (step S316).

The terminal device 100 having received the response retransmits a command for requesting personal authentication to the IC chip 20 of the IC card 1 in a case that the content of the response is an authentication result other than "success of personal authentication" (step S318).

Next, the IC chip 20 reads the two types of biometric authentication information A and B from the storage 40, encrypts the biometric authentication information A and B with the session key, and transmits the encrypted biometric authentication information A and B and the generated random number to the collation processor 60 (step S320).

In response thereto, the collation processor 60 transmits request information for requesting transmission of fingerprint information to the fingerprint sensor 50 (step S322).

The fingerprint sensor 50 having received the request information acquires fingerprint information Y (step S324) and transmits the fingerprint information Y to the collation processor 60 in a predetermined data format and transmission period (step S326).

Next, the collation processor 60 decrypts the encrypted biometric authentication information A and B by using the session key generated when a first command is received. Then, the collation processor 60 collates each piece of the decrypted biometric authentication information A and B with the fingerprint information Y acquired by the fingerprint sensor 50 (step S328).

FIG. 9 is a diagram showing an example of processing content corresponding to collation results when two types of biometric authentication information are used. For example, when the score of the biometric authentication information B different from the biometric authentication information A (update target biometric authentication information) of which the collation result does not satisfy the first predetermined condition when the first command is received among scores of biometric authentication information for the fingerprint information Y received in the processing of S324 is 90 or more (when the first predetermined condition is satisfied), the collation processor 60 determines that the personal authentication has succeeded in a case that the score of the other biometric authentication information A is less than 90. The collation processor 60 transmits the fingerprint information X held in the storage 40 to the IC chip 20 when the first command is received together with the determination result. In a case that the score of the biometric authentication information A is less than 70 when the first command is received and the second predetermined condition is not satisfied, the fingerprint information X temporarily stored in the storage 40 is discarded, so that the collation processor 60 does not transmit the fingerprint information X to the IC chip 20.

When the score of the biometric authentication information B is less than 90, the collation processor 60 discards the fingerprint information X held in the storage 40 when the first command is received and determines that the personal authentication has failed in a case that the score of the biometric authentication information A is less than 90.

As described above, the collation processor 60 performs a determination in accordance with the scores of the biometric authentication information A and B, encrypts collation results of the biometric authentication information, and transmits the encrypted collation results to the IC chip 20 (step S330). At this time, in a case that it is determined that the personal authentication has succeeded when a second command is received, the collation processor 60 discards the session key generated when the first command is received, generates a new session key by performing an exclusive OR operation on the fingerprint information X temporarily held in the storage 40 and the common key 46, and encrypts collation results of the biometric authentication information by using the session key. Then, the collation processor 60 transmits the collation results encrypted using the new session key and the fingerprint information X to the IC chip 20 (step S332).

Next, the IC chip 20 determines whether or not there is a change in the session key of the collation processor 60 in accordance with the presence or absence of the fingerprint information X of information received from the collation processor 60 (step S334). For example, in a case that the fingerprint information X is not included in the received information, the IC chip 20 determines that the session key has not been changed and uses the session key generated when the first command is received to decode the collation results transmitted by the collation processor 60. On the other hand, in a case that the fingerprint information X is included in the information received from the collation processor 60, the IC chip 20 determines that the session key has been changed, generates a new session key by using the received fingerprint information X and the common key 46 stored in the storage 40, and uses the newly generated session key to decrypt the encrypted collation results.

In a case that the fingerprint information X is included in the information received from the collation processor 60, the IC chip 20 updates update target biometric authentication information serving as a processing target when the first command is received, that is, the biometric authentication information A, to the received fingerprint information X. At this time, the IC chip 20 may extract features such as feature quantities and feature points from the fingerprint information X at appropriate times, and designate the extracted features as update target biometric authentication information.

Next, the IC chip 20 executes command processing corresponding to the command received in the processing of S318 on the basis of the decrypted collation results. Then, the IC chip 20 transmits a response, which is a command processing result, to the terminal device 100 via the UART 24 (step S336).

Figure 10:
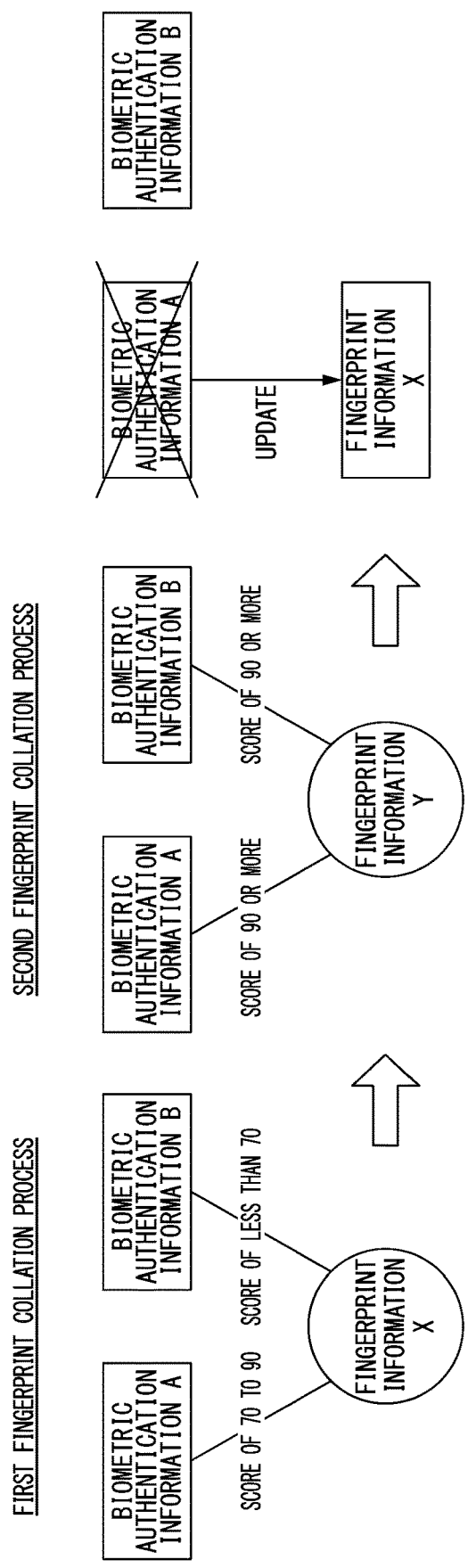
FIG. 10 is a diagram schematically showing sequence processing illustrated in FIG. 9.

FIG. 10 is a diagram schematically showing sequence processing illustrated in FIG. 9. For example, when the first command is received, in a case that a result of collating each piece of the biometric authentication information A and the biometric authentication information B with the fingerprint information X acquired by the fingerprint sensor 50 in the collation processor 60 indicates that a score associated with the biometric authentication information A is 70 or more and less than 90 and the score associated with the biometric authentication information B is less than 70, the terminal device 100 retransmits a command for requesting personal authentication to the IC card 1 because both the scores are less than the first threshold value Th1 (=90) used to determine that "personal authentication has succeeded."

For example, when the second command is received, in a case that a result of collating each piece of the biometric authentication information A and the biometric authentication information B with the fingerprint information X newly acquired by the fingerprint sensor 50 in the collation processor 60 indicates that a score associated with the biometric authentication information A is less than 70 and the score associated with the biometric authentication information B is 90 or more, it is determined that "personal authentication has succeeded." In this case, the biometric authentication information A of which the score is less than 90 in the first and second processes is updated to the fingerprint information X.

According to at least one embodiment described above, there are provided a communicator (24) configured to communicate with a terminal device (100); a storage (40) storing a plurality of pieces of biometric authentication information (42); an acquirer (50) configured to acquire biometric information (fingerprint information) of a user; and the processor (30) configured to collate the biometric information acquired by the acquirer with each of the plurality of pieces of biometric authentication information stored in the storage in a case that a command is received from the terminal device through the communicator and update some of the plurality of pieces of biometric authentication information stored in the storage to information on the basis of the biometric information acquired by the acquirer in accordance with collation results for the biometric authentication information, so that it is possible to improve the accuracy of authentication using biometric information.

For example, when the pre-registered biometric authentication information and the acquired biometric information match to a certain extent in the first personal authentication but it is not possible to determine that the personal authentication is successful, the second person authentication is further performed. At this time, in a case that a degree of matching between the newly acquired biometric information and the pre-registered biometric authentication information is greater than or equal to the first threshold value Th1, that is, in a case that the personal authentication succeeds, it is possible to perform personal authentication in consideration of an influence of a change or the like in the skin due to aging or trauma because biometric authentication information for which a person's identity is likely to be confirmed in the first personal authentication is updated to first acquired biometric information. Because the biometric authentication information is updated at the appropriate time in the operation process of the IC card 1, security can be improved.

According to at least one embodiment described above, because information transmitted and received between the IC chip 20 configured to implement the processor 30 and the collation processor 60 is encrypted using a temporary session key, it is possible to improve security of data to be transmitted via a connection which is physically easily hacked (the internal bus BS1).

According to at least one embodiment described above, because the session key used for encrypting information is generated using biometric information to be updated, it is possible to further improve security.

The above-described embodiment can be represented as follows.

An integrated circuit card including:
a communicator configured to communicate with a terminal device;
a storage storing a plurality of pieces of biometric authentication information;
an acquirer configured to acquire biometric information of a user; and
a processor configured to execute a program stored in the storage,
wherein the processor is configured to execute a process of collating the biometric information acquired by the acquirer with each of the plurality of pieces of biometric authentication information stored in the storage in a case that the communicator receives a command from the terminal device and updating some of the plurality of pieces of biometric authentication information stored in the storage with information on the basis of the biometric information acquired by the acquirer in accordance with collation results for the biometric authentication information by executing the program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An integrated circuit card comprising:
a communicator configured to communicate with a terminal device;
a storage storing a plurality of pieces of biometric authentication information for at least one user to be authenticated:
an acquirer configured to acquire biometric information of the at least one user; and
a processor configured to collate the biometric information acquired by the acquirer with each of the plurality of pieces of biometric authentication information stored in the storage in a case that the communicator receives a command from the terminal device, identify one of the plurality of pieces of biometric authentication information whose matching score with acquired biometric information is greater than or equal to a second threshold value which is less than a first threshold value as a collation matching score, and update the identified one of the plurality of pieces of biometric authentication information stored in the storage with a corresponding acquired biometric information in accordance with the condition that it is found to be successful in the collation when the communicator receives a second command and collates the biometric authentication information stored in the storage with the biometric information acquired by the acquirer.

2. The integrated circuit card according to claim 1, wherein
the processor is configured to:
collate a first biometric information acquired by the acquirer with each of the plurality of pieces of biometric authentication information stored in the storage in a case that the communicator receives a first command from the terminal device;
store the first biometric information into the storage in a case that a collation result of a first biometric authentication information of the plurality of pieces of biometric authentication information for the first biometric information does not satisfy a predetermined condition;
collate a second biometric information newly acquired by the acquirer with each of the plurality of pieces of biometric authentication information stored in the storage in a case that the communicator receives a second command from the terminal device;
update the first biometric authentication information with information on the basis of the first biometric information stored in the storage in a case that a collation result of a second biometric authentication information of the plurality of pieces of biometric authentication information for the second biometric information satisfies the predetermined condition.

3. A method for controlling an integrated circuit card comprising a processor, a communicator configured to communicate with a terminal device, a storage storing a plurality of pieces of biometric authentication information for at least one user to be authenticated, and an acquirer configured to acquire biometric information of the at least one user, the method comprising:

collating, by the processor, the biometric information acquired by the acquirer with each of the plurality of pieces of biometric authentication information stored in the storage in a case that the communicator receives a command from the terminal device, identifying one of the plurality of pieces of biometric authentication information whose matching score with acquired biometric information is greater than or equal to a second threshold value which is less than a first threshold value as a collation matching score, and updating the identified one of the plurality of pieces of biometric authentication information stored in the storage with a corresponding acquired biometric information in accordance with the condition that it is found to be successful in the collation when the communicator receives a second command and collates the biometric authentication information stored in the storage with the biometric information acquired by the acquirer.

4. An integrated circuit card comprising:

an acquirer configured to acquire biometric information of at least one user to be authenticated;

an integrated circuit module including a communicator configured to communicate with a terminal device, a storage storing a plurality of pieces of biometric authentication information for the at least one user, and a processor configured to collate the biometric information acquired by the acquirer with each of the plurality of pieces of biometric authentication information stored in the storage in a case that the communicator receives a command from the terminal device, identify one of the plurality of pieces of biometric authentication information whose matching score with acquired biometric information is greater than or equal to a second threshold value which is less than a first threshold value as a collation matching score, and update the identified one of the plurality of pieces of biometric authentication information stored in the storage with a corresponding acquired biometric information in accordance with the condition that it is found to be successful in the collation when the communicator receives a second command and collates the biometric authentication information stored in the storage with the biometric information acquired by the acquirer; and a card base material in which the acquirer and the integrated circuit module are embedded.

5. The integrated circuit card according to claim 4, wherein hardware configured to perform a collation process among processes to be performed by the processor is provided outside the integrated circuit module, and the acquirer, the integrated circuit module, and the hardware are embedded in the card base material.

6. The integrated circuit card according to claim 5, wherein the integrated circuit module is configured to encrypt first information with a public key and transmit the encrypted first information to the hardware, the hardware is configured to encrypt second information with the public key and transmit the encrypted second information to the integrated circuit module, the integrated circuit module is configured to decode the second encrypted information using the public key, and the hardware is configured to decode the first encrypted information using the public key.

7. The integrated circuit card according to claim 6, wherein the integrated circuit module and the hardware are configured to update the public key using the biometric information acquired by the acquirer.

8. An integrated circuit card comprising:

an acquirer configured to acquire biometric information of a user;

an integrated circuit module including a communicator configured to communicate with a terminal device, a storage storing a plurality of pieces of biometric authentication information, and a processor configured to collate the biometric information acquired by the acquirer with each of the plurality of pieces of biometric authentication information stored in the storage in a case that the communicator receives a command from the terminal device and update some of the plurality of pieces of biometric authentication information stored in the storage to information on the basis of the biometric information acquired by the acquirer in accordance with collation results for the biometric authentication information; and a card base material in which the acquirer and the integrated circuit module are embedded, wherein hardware configured to perform a collation process among processes to be performed by the processor is provided outside the integrated circuit module, the acquirer, the integrated circuit module, and the hardware are embedded in the card base material, the integrated circuit module is configured to encrypt first information with a public key and transmit the encrypted first information to the hardware, the hardware is configured to encrypt second information with the public key and transmit the encrypted second information to the integrated circuit module, the integrated circuit module is configured to decode the second encrypted information using the public key, and the hardware is configured to decode the first encrypted information using the public key.

\* \* \* \* \*